United States Patent [19]

Abel et al.

[11] 4,405,329

[45] Sep. 20, 1983

[54] STABLE CONCENTRATED FLUID FORMULATIONS OF METAL-FREE DYES, PROCESS FOR THEIR PREPARATION, AND THEIR USE

[75] Inventors: Heinz Abel, Reinach; Paul Hugelshofer, Muttenz, both of Switzerland

[73] Assignee: Ciba-Geigy Corporation, Ardsley, N.Y.

[21] Appl. No.: 268,978

[22] Filed: Jun. 1, 1981

[30] Foreign Application Priority Data

Jun. 4, 1980 [CH] Switzerland .................. 4334/80

[51] Int. Cl.³ .................. C09B 67/42; C09B 67/46; D06P 1/04; D06P 1/20
[52] U.S. Cl. .................. 8/527; 8/580; 8/602; 8/436; 8/437
[58] Field of Search .................. 8/527, 580, 602

[56] References Cited

U.S. PATENT DOCUMENTS

| | | | |
|---|---|---|---|
| 4,023,924 | 5/1977 | Frei et al. | 8/527 |
| 4,043,752 | 8/1977 | Kilmurry et al. | 8/611 |
| 4,110,073 | 8/1978 | Mollet et al. | 8/594 |
| 4,322,415 | 3/1982 | Abel et al. | 8/582 |
| 4,328,220 | 5/1982 | Abel et al. | 8/582 |

FOREIGN PATENT DOCUMENTS

| | | |
|---|---|---|
| 863188 | 1/1978 | Belgium . |
| 1197520 | 7/1970 | United Kingdom . |
| 2664 | 2/1978 | United Kingdom . |

*Primary Examiner*—Maria Parrish Tungol
*Attorney, Agent, or Firm*—Edward McC. Roberts

[57] ABSTRACT

Concentrated fluid formulations of textile dyes, leather dyes or paper dyes, comprising
(1) metal-free dyes,
(2) non-ionic compounds having a hydrotropic action, at least one of components (3) or (4), component
(3) being a reaction product of a fatty acid having 8 to 22 carbon atoms and 1 to 2 mols of diethanolamine, and component
(4) being a compound of the formula

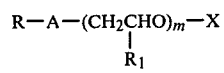

in which R is an aliphatic hydrocarbon radical having 8 to 22 carbon atoms or a cycloaliphatic, aromatic or aliphatic-aromatic hydrocarbon radical having 10 to 22 carbon atoms, $R_1$ is hydrogen or methyl, A is —O— or

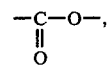

X is the acid radical of an inorganic, oxygen-containing acid, the acid radical of a polybasic carboxylic acid or a carboxyalkyl radical and m is a number from 1 to 50,
(5) water, a water-soluble organic solvent having a boiling point of at least 80° C., or a mixture of the two, and,
(6) optionally conventional formulating assistants, have excellent stability over a wide temperature range and, on dilution with water or solvents, do not form any undesired multi-phase systems or precipitates.

32 Claims, No Drawings

STABLE CONCENTRATED FLUID FORMULATIONS OF METAL-FREE DYES, PROCESS FOR THEIR PREPARATION, AND THEIR USE

The present invention relates to stable concentrated fluid formulations of metal-free textile dyes, leather dyes or paper dyes.

The subject of the present invention are stable concentrated fluid formulations of textile dyes, leather dyes or paper dyes, which comprise
(1) metal-free dyes,
(2) non-ionic compounds having a hydrotropic action, at least one of the components (3) or (4), component
(3) being a reaction product of a fatty acid having 8 to 22 carbon atoms and 1 to 2 mols of diethanolamine, and the component
(4) being a compound of the formula $$R-A-(CH_2CHO)_m-X \quad (1)$$
$$\qquad\qquad\quad |$$
$$\qquad\qquad\quad R_1$$

in which R is an aliphatic hydrocarbon radical having 8 to 22 carbon atoms or a cycloaliphatic, aromatic or aliphatic-aromatic hydrocarbon radical having 10 to 22 carbon atoms, $R_1$ is hydrogen or methyl, A is —O— or

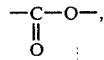

X is the acid radical of an inorganic oxygen-containing acid, the acid radical of a polybasic carboxylic acid or a carboxyalkyl radical and m is a number from 1 to 50,
(5) water, a water-soluble organic solvent having a boiling point of at least 80° C., or a mixture of the two, and,
(6) optionally conventional formulating assistants.

The invention also relates to a process for the preparation of the fluid formulations and to their use for the preparation of padding liquors, dye baths, print pastes or spray solutions, which are used especially for dyeing and printing textile materials, leather and paper. The dyes can be either those which are readily soluble in water or those which are sparingly soluble to insoluble in water.

The metal-free dyes used can be known dyes of the most diverse dye categories, for example oxazine dyes, triphenylmethane dyes, xanthene dyes, nitro dyes, acridone dyes, stilbene dyes, perinone dyes, quinophthalone dyes, naphthoquinimine dyes and azomethine dyes, but especially acid anthraquinone dyes and anionic azo dyes (monoazo, bisazo and polyazo dyes).

The dyes can be reactive or non-reactive with the substrates which are to be dyed.

Examples of reactive groupings are: epoxy groups, ethyleneimine groups, isocyanate groups, isothiocyanate groups, carbamic acid aryl ester groups, the propiolic acid amide grouping, mono- and di-chlorocrotonyl groups, chloroacrylamino groups, acrylamino groups, groupings which contain a labile substituent and which can readily be cleaved, the pair of bond electrons being taken away, for example sulfohalide groups, aliphatically bonded sulfuric acid ester groups and aliphatically bonded sulfonyloxy groups and halogen atoms, in particular an aliphatically bonded chlorine atom, or the vinylacyl group, for example vinylsulfo groups and the carboxyvinyl group. Advantageously, these labile substituents are in the γ-position or β-position of an aliphatic radical which is bonded direct or via an amino, sulfone or sulfonic acid amide group to the dye molecule. In those dyes which contain halogen atoms as the labile substituents, these exchangeable halogen atoms can also be present in an aliphatic acyl radical, for example in an acetyl radical, or in the β-position, or in the α- and β-positions, of a propionyl or acryl radical, or in a heterocyclic radical, for example in a pyrimidine ring, pyridazine ring or triazine ring. Advantageously, the dyes contain a grouping of the formula

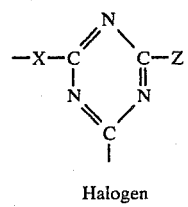

or

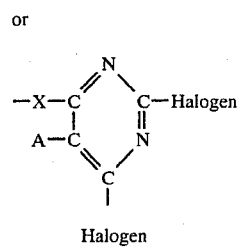

in which X is a nitrogen bridge and Z is a hydrogen atom, a substituted or unsubstituted amino group, an etherified hydroxyl or mercapto group, or a halogen atom or an alkyl, aryl or aralkyl group, and A is a hydrogen atom or halogen atom. The halogen atoms are, for example, fluorine atoms and bromine atoms, but preferably chlorine atoms.

The following radicals are further suitable reactive groupings: trichloropyridazine, dichloroquinoxaline, dichlorobutene, halogenated pyridazone, sulfonic acid dichloropropylamide, allylsulfone, allylsulfide, 2-halogeno-benzthiazole carbamide and β-sulfatopropionic acid amide radicals.

Reactive onium dyes which carry, for example in place of a reactive halogen atom, a reactive ammonium radical or hydrazinium radical, may also be mentioned.

Optionally the dyes can also be present in the form of mixtures with one another or, optionally with dyes of a different type.

Suitable non-ionic compounds having a hydrotropic action, representing the component (2), are for example reaction products, having a molecular weight of about 2,000 to 7,000, of
($a_1$) monohydric to hexahydric alcohols having 1 to 6 carbon atoms, monoalkylamines or monoalkylolmonoamines or polyalkylenepolyamines and
($a_2$) 1,2-propylene oxide, reaction products of alkylene oxides and a water-insoluble aliphatic monoalcohol having at least 8 carbon atoms, reaction products of alkylene oxides and arylphenols or alkylphenols, reaction products of saturated dicarboxylic acids having 3 to 10 carbon atoms and 1,2-propylene oxide or polypropylene glycols, reaction products of fatty acids having 10 to 18 carbon atoms and 1,2-propylene oxide or polypropylene glycols, reaction products of fatty acids having 10 to 18 carbon atoms, trihydric to hexahydric alcohols and 1,2-propylene oxide or reaction products of fatty acids having 10 to 18 carbon atoms, polyalkylenepolyamines and 1,2-propylene oxide.

The reaction products of (a₁) and (a₂) can have molecular weights of especially 2,000 to 6,000 and preferably of about 2,000 to 4,000. As a rule, these reaction products are obtained by the addition of about 30 to 120 mols of 1,2-propylene oxide to 1 mol of a monohydric to hexahydric aliphatic alcohol having 1 to 6 carbon atoms, of a monoalkylamine or monoalkylolmonoamine or of a polyalkylenepolyamine.

Examples of monohydric to hexahydric alcohols are methyl alcohol, ethyl alcohol, propyl alcohol or butyl alcohol, ethylene glycol, diethylene glycol and triethylene glycol, propylene glycol, dipropylene glycol, propane-1,3-diol, butane-1,2-diol, butane-1,3-diol, butane-1,4-diol and butane-2,3-diol, glycerol, trimethylolethane and trimethylopropane, hexane-1,2,5-triol and hexane-1,2,6-triol, 3-hydroxymethylpentane-2,4-diol, erythritol, pentaerythritol, dipentaerythritol, mannitol and sorbitol.

Dihydric to hexahydric alcohols having 2 to 6 carbon atoms, such as ethylene glycol, propylene glycol, glycerol, pentaerythritol, sorbitol, trimethylolethane and trimethylolpropane are preferred, propylene glycol being particularly preferred.

The monoalkylmonoamines can contain 1 to 18, in particular 1 to 6 and preferably 2 to 4, carbon atoms and these are, for example, ethylamine, propylamine, octylamine, decylamine, dodecylamine, hexadecylamine or octadecylamine.

The monoalkylolmonoamines are as a rule those having 1 to 6, preferably 2 to 4, carbon atoms, for example ethanolamine, propanolamine, ispropanolamine or butanolamine.

The polyalkylenepolyamines are preferably of the formula

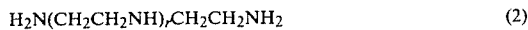

H₂N(CH₂CH₂NH)ᵣCH₂CH₂NH₂ (2)

in which r is 0 or a number from 1 to 3.

The majority of the compounds representing the component (2) are known commercial products. 1,2-Propylene oxide adducts of the following alcohols, monoamines and polyamines may be mentioned individually, the preferred mean molecular weight being indicated in brackets: ethylene glycol (2,000), propylene glycol (2,000) and (2,700), glycerol (3,000), (3,100) and (4,000), trimethylolpropane (2,500), (3,200), (4,00) and (6,300), ethylenediamine (3,600), monoisopropanolamine (2,300) and also trimethylolpropane/1,2-propylene oxide/ethylene oxide (3,700).

Other suitable components (2) are the alkylene oxide reaction products of water-insoluble aliphatic monoalcohols having at least 8 carbon atoms, such as 1,2-propylene oxide reaction products, for example those which contain 1 to 30 mols of added 1,2-propylene oxide, but in particular ethylene oxide reaction products of these alcohols. The alcohols can preferably contain 8 to 18 carbon atoms, they can be saturated or unsaturated, branched or straight-chain and they can be used alone or in a mixture.

Natural alcohols, for example myristyl alcohol, cetyl alcohol, stearyl alcohol or oleyl alcohol, or synthetic alcohols, such as, in particular, 2-ethylhexanol and also triethylhexanol, trimethylnonyl alcohol or Alfols (tradename-Continental Oil Company) can be empolyed. The Alfols are linear primary alcohols. The number after the name indicates the average carbon number of the alcohol; thus, for example, Alfol (1218) is a mixture of decyl alcohol, dodecyl alcohol, tetradecyl alcohol, hexadecyl alcohol and octadecyl alcohol. Further representative are Alfol (810), Alfol (12), Alfol (16) and Alfol (18).

Preferred ethylene oxide reaction products can, for example, be represented by the following formula

R₃O(CH₂CH₂O)ₛH (3)

in which R₃ is a saturated or unsaturated hydrocarbon radical, preferably an alkyl radical, having 8 to 18 carbon atoms and s is a number from 1 to 10. If s is a number from 1 to 3, these are as a rule water-insoluble products, whilst the reaction products with a greater number of ethylene oxide units are water-soluble. Examples of these products are the reaction products of, in particular, 2ethylhexanol, and also lauryl alcohol, tridecyl alcohol, hexadecyl alcohol and stearyl alcohol, with ethylene oxide.

The component (2) can also be a reaction product, which is sparingly soluble in water, of ethylene oxide and/or 1,2-propylene oxide and alkylphenols having 4 to 12 carbon atoms in the alkyl part. Preferably, these compounds are of the formula

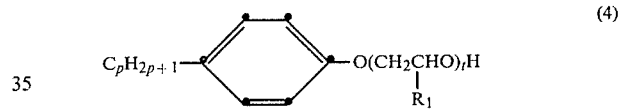

in which R₁ is hydrogen or methyl, p is a number from 4 to 12, preferably 8 to 9, and t is a number from 1 to 60, especially from 1 to 30 and preferably 1 to 3.

The following octylphenol and nonylphenol reaction products may be mentioned in particular: p-nonylphenol/30 mols of propylene oxide; p-octylphenol/2 mols of ethylene oxide; p-nonylphenol/3 mols of ethylene oxide and p-nonylphenol/60 mols of 1,2-propylene oxide.

Arylphenol/alkylene oxide adducts are in particular o-phenylphenol/ethylene oxide adducts. The number of ethylene oxide units can be about 1 to 20, preferably 2 to 10.

Reaction products of saturated dicarboxylic acid having 3 to 10, in particular 6 to 10, carbon atoms and of 1,2-propylene oxide or polypropylene glycols are likewise suitable as the component (2). The dicarboxylic acid can, for example, be malonic acid, succinic acid, glutaric acid, adipic acid, pimelic acid, suberic acid, azelaic acid or sebacic acid. Adipic acid and sebacic acid are preferred. The number of 1,2-propylene oxide units in the reaction products can be about 2 to 40. Finally, reaction products of fatty acids having 10 to 18 carbon atoms and 1,2-propylene oxide or polypropylene glycols can also be employed. The fatty acids can be saturated or unsaturated, such as capric acid, lauric acid, myristic acid, palmitic acid or stearic acid, or decenoic acid, dodecanoic acid, tetradecenoic acid, hexadecenoic acid, oleic acid, linoleic acid, linolenic acid or riccinoleic acid. The number of 1,2-propylene oxide units in these esters can be approximately the same as in the abovementioned reaction products.

Further reaction products which are suitable as the component (2) are obtained from the abovementioned fatty acids having 10 to 18 carbon atoms, trihydric to hexahydric alcohols or polyalkylenepolyamines and 1,2-propylene oxide.

The trihydric to hexahydric alcohols preferably contain 3 to 6 carbon atoms and are especially glycerol, trimethylolpropane, pentaerythritol and sorbitol. The polyalkylenepolyamines can be represented by the formula (2).

Examples are the reaction product of laurylsorbitol and 1,2-propylene oxide (molecular weight 2,500) and the reaction product of the polyaminoamide of the formula

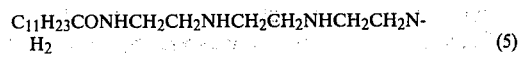

$$C_{11}H_{23}CONHCH_2CH_2NHCH_2CH_2NHCH_2CH_2NH_2 \quad (5)$$

(lauric acid/triethylenetetramine) and 1,2-propylene oxide (molecular weight 2,600).

The compounds, and reaction products, mentioned as the component (2) are either known, and some of them are commerically available, or they can be prepared by known methods familiar to those skilled in the art.

The fatty acids, which are suitable for the preparation of the reaction products representing component (3), and optionally also fatty acid derivatives, such as fatty acid alkyl esters, can be saturated or unsaturated and substituted or unsubstituted. The following fatty acids may be mentioned individually: caprylic acid, capric acid, lauric acid, myristic acid, palmitic acid, stearic acid, arachinic acid, behenic acid, coconut fatty acid ($C_8$–$C_{18}$), decenoic acid, dodecenoic acid, tetradecenoic acid, hexadecenoic acid, oleic acid, linoleic acid, linolenic acid, ricinoleic acid, eicosenoic acid, docosenoic acid or clupanodonic acid.

Reaction products of lauric acid, stearic acid, oleic acid and especially coconut fatty acid with 1 to 2 mols, in particular 2 mols, if diethanolamine are preferred. It is also possible to use mixtures of the reaction products representing the component (3).

The compounds representing the component (4) are anionic compounds. The radical R-A- in the compounds of the formula (1) is, for example, derived from higher alcohols, such as decyl alcohol, lauryl alcohol, tridecyl alcohol, myristyl alcohol, cetyl alcohol, stearyl alcohol, oleyl alcohol, arachidyl alcohol or behenyl alcohol; or it is derived from alicyclic alcohols, such as hydroabietyl alcohol; from fatty acids, such as caprylic acid, capric acid, lauric acid, myristic acid, palmitic acid, stearic acid, arachinic acid, behenic acid, coconut fatty acid ($C_8$–$C_{18}$), decenoic acid, dodecenoic acid, tetradecenoic acid, hexadecenoic acid, oleic acid, linoleic acid, linolenic acid, eicosenoic acid, docosenoic acid or clupanodonic acid; from alkylphenols, such as butylphenol, hexylphenol, n-octylphenol, n-nonylphenol, p-tert.-octylphenol, p-tert.-nonylphenol, decylphenol, dodecylphenol, tetradecylphenol or hexadecylphenol or from arylphenols, such as o-phenylphenol or p-phenylphenol. Radicals having 10 to 18 carbon atoms, in particular those which are derived from alkylphenols, are preferred.

The acid radical X is as a rule the acid radical of a polybasic, in particular low-moleculr, monocarboxylic or dicarboxylic acid, for example the radical of maleic acid, malonic acid, succinic acid or sulfosuccinic acid, or it is a carboxyalkyl radical, in particular a carboxymethyl radical (derived in particular from chloroacetic acid) and it is linked to the radical R-A-$(CH_2CHR_1O)_m$ via an ether bridge or ester bridge. In particular, however, X is derived from inorganic polybasic acids, such as orthophosphoric acid and sulfuric acid. The acid radical X is preferably present in the form of a salt, i.e., for example, as an alkali metal salt, ammonium salt or amine salt. Examples of such salts are sodium salts, calcium salts, ammonium salts, trimethylamine salts, ethanolamine salts, diethanolamine salts or triethanolamine salts. The alkylene oxide units $-(CH_2CHR_1O)-$ in formula (1) are as a rule ethylene oxide units and 1,2-propylene oxide units, and the latter are preferably present as a mixture with ethylene oxide units in the compounds of the formula (1).

The preparation of these compounds is carried out by known methods, by adding ethylene oxide, or alternately in any desired sequence, ethylene oxide and 1,2-propylene oxide to the said alcohols, acids and alkylphenols, subsequently esterifying the adducts and optionally converting the esters into their salts. The compounds representing the component (4) are, for example, known from U.S. Pat. No. 3,211,514. Those compounds of the formula (1) are now preferred, which are of the formulae

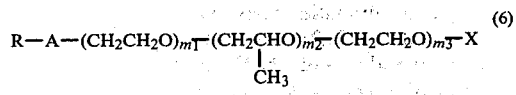

$$R-A-(CH_2CH_2O)_{m_1}-(CH_2CHO)_{m_2}-(CH_2CH_2O)_{m_3}-X \atop \quad\quad\quad\quad\quad\quad\quad\quad\quad\quad |\atop \quad\quad\quad\quad\quad\quad\quad\quad\quad\quad CH_3 \quad (6)$$

and in particular

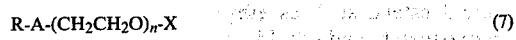

$$R-A-(CH_2CH_2O)_n-X \quad (7)$$

in which R, A and X are as defined, the sum of $m_1$, $m_2$ and $m_3$ is 2 to 20, the ratio of ethylene oxide groups to propylene oxide groups in compounds of the formula (6) is 1:(1 to 2), preferably 1:1, and n is a number from 1 to 9, preferably 1 to 5 or 1 to 4.

Of particular interest are also the anionic compounds of the formula

$$R_2O(CH_2CH_2O)_n-X \quad (8)$$

in which $R_2$ is a saturated or unsaturated hydrocarbon radical, o-phenylphenyl or alkylphenyl having 4 to 12 carbon atoms in the alkyl part, and X and n are as defined.

Amongst the compounds derived from alkylphenyl-/ethylene oxide adducts, those of the formulae

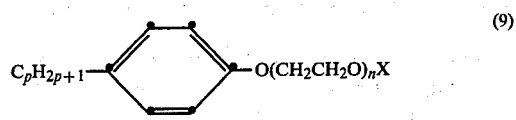

(9)

and

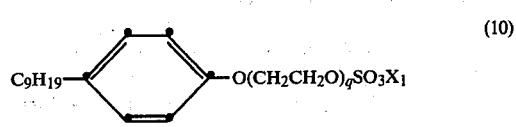

(10)

in which p is a number from 4 to 12, q is a number from 1 to 3, $X_1$ is H, $NH_4^\oplus$ or an alkali metal cation, and X and n are as described, are also particularly preferred. At least one compound representing the component (4)

is employed, optionally as a mixture of the compounds indicated.

Examples of water-soluble organic solvents which are suitable as the component (5) and having a boiling point of at least 80° C. and which can be used alone or also as mixtures, are the particularly preferred polyhydric alcohols, which are liquid at room temperature, or their ethers and/or esters, such as ethylene glycol, propylene glycol, di- and tri-ethylene glycol, glycerol, 2-methylpentane-2,4-diol, the monomethyl, monoethyl or monobutyl ethers of ethylene glycol, propylene glycol or diethylene glycol, triethylene glycol monobutyl ether, dipropylene glycol, glycerol 1,3-diethyl ether, diethylene glycol monoether-acetate, thiodiglycol, polyethylene glycols and water-soluble polyethers.

Ketones and hydroxyketones, such as methyl ethyl ketone, acetonylacetone and diacetone alcohol, monoalcohols which may contain either groups, such as isopropyl alcohol, 2-hydroxymethyltetrahydropyran, tetrahydrofurfuryl alcohol, glycerol formal (5-hydroxy-1,3-dioxane), phosphorus compounds, such as phosphates or phosphonates, for example dimethyl methylphosphonate, and N,N,N',N'-tetramethylurea are also preferred solvents.

Moreover, low-molecular aliphatic carboxylic acids, such as formic acid, acetic acid and lactic acid, low-molecular aliphatic carboxylic acid amides, such as formamide, N,N-dimethylformamide, N,N-dimethylacetamide and N,N-dimethylmethoxyacetamide, and alkanolamines, for example ethanolamine, are also suitable. Lactams and lactones, such as N-methylpyrrolidone, 1,5-dimethylpyrrolidone and γ-butyrolactone, liquid esters, such as ethyl lactate, diethylene glycol monoacetate and ethyl hydroxybutyrate, nitriles which may contain hydroxy groups, such as acetonitrile, and β-hydroxypropionitrile, sulfur-containing compounds, such as sulfolane (=tetramethylenesulfone), sulfolene (=2,3- or 2,5-dihydrothiophene S-dioxide) and their derivatives which are substituted in the α- and/or β-position, in particular, by alkyl groups or hydroxyalkyl groups, dimethyl sulfoxide, phosphoric acid amides, such as hexamethylphosphoric acid triamide and methylphosphonic acid bis-N,N-dimethylamide, and also simple heterocyclic compounds, such as tetrahydrofuran, pyridine, dioxane and glycol formal (=1,3-dioxolane) can also be used.

The conventional formulating assistants can, for example, be inorganic salts, such as sodium chloride, sodium sulfate, sodium bisulfate, sodium carbonate or mono-, di- and tri-sodium phosphate, and also sodium benzenesulfonate, ligninsulfonates, dinaphthylmethanedisulfonates or derivatives thereof, sugars, dextrin or urea.

As further additives, the concentrated fluid formulations according to the invention can contain antifoams, for example silicone oils, and substances which inhibit fungal and/or bacterial growth, and also acids or bases.

The fluid formulations are prepared by mixing the metal-free dyes with the components (2) and (3), (2) and (4) or (2), (3) and (4) in any desired sequence in water, a water-soluble organic solvent or mixtures thereof, if appropriate in the presence of conventional formulating assistants and further additives. The preferred procedure is to stir (for example when reactive dyes are used) the mixture at room temperature (15° to 30° C.) or to heat it, with stirring, at temperatures of up to 130° C., for example at temperatures from 40° to 130° C., preferably 40° to 80° C., depending on the nature of the solvent used, and then to allow it to cool to room temperature. The fluid formulations are, as a rule, true or colloidal solutions.

The metal-free dyes used for the preparation of the stable fluid formulations according to the invention can be crude dyes (as they are obtained in the synthesis) or they can be pre-purified dyes, for example dyes which have been largely desalinated. Thus, for example, synthesis by-products or water-soluble salts and, if desired, also water can be separated off (for example by precipitating the dyes) from an aqueous solution or suspension of a metal-free water-soluble crude dye or mixture of crude dyes, and the dyes can then be dried, if appropriate, before they are mixed as indicated with the components (2) and (3), (2) and (4) or (2), (3) and (4) in any desired sequence in water, a water-soluble organic solvent or mixtures thereof, if appropriate in the presence of conventional formulating assistants, and the formulations according to the invention are thus obtained.

Fluid formulations, which contain organic solvents, advantageously have the following composition: 10 to 60, preferably 10 to 30, percent by weight of component (1), 1 to 25, preferably 1 (or 3) to 20, percent by weight of component (2), 1 (or 3) to 20, preferably 3 to 15, percent by weight of component (3) and/or (4) and 20 to 88 or 20 to 84 and preferably 30 to 88 or 84 percent by weight of component (5), the component (5) being a water-soluble organic solvent (or a mixture of such solvents) having a boiling point of at least 80° C., or being a mixture of water and these solvents.

The weight ratio of component (2) to component (3) or (4), or to the latter two components, can preferably be about 2:1 to 1:3, whilst the ratio of components (3) and (4) to one another—if they are employed together—can be 4:1 to 1:2, preferably 2:1 to 1:1.

The formulations have a good storage stability, that is to say they remain in a ready-to-use state for at least several months at temperatures of −20° to +60° C., preferably −10° to +40° C. Precipitations of dyes or other components of the formulations are not observed. When preparing padding liquors, dye baths, print pastes and spray solutions, these formulations can be diluted with water or with organic solvents, without causing the dyes, for example dyes which are sparingly soluble to insoluble in water, to precipitate or without causing other inhomogeneities. The said padding liquors, dye baths, print pastes and spray solutions can be used for dyeing or printing, for example, textile materials of natural or synthetic fibre materials and also leather or paper.

The stable concentrated fluid dye formulations according to the invention are particularly suitable for spray-dyeing of leather, since they can be mixed both with water (for example 1 part of concentrated dye formulation in 4 to 9 parts of water) or with organic solvents, for example etherified glycols, or alcohols, such as isopropanol, or nitro lacquers (for example consisting of 15% of nitrocellulose, 10% of synthetic resin, 5% of plasticiser, 20% of low-boiling solvents (methanol, acetone), 45% of medium-boiling solvents (benzene) and 5% of high-boiling solvents (glycols) (Römpp's Chemie Lexikon, 7th edition 1974), without causing a change in the state of distribution (of the solution) of the dye.

As stated earlier, these mixtures remain stable for several months, but in particular for a period of about 3 to 14 days, and accordingly, for example, show no precipitation, crystallisation or agglomeration of the dye.

Furthermore, during this time, the solutions also do not form any multi-phase systems.

The homogeneity of such mixtures should remain fully preserved over the entire period of time. Precipitation of the dye in the mixture would have very troublesome effects during application (for example by spraying), such as blockage of the spray nozzles, or would manifest itself in bronzing of the dye on the surface of the leather.

If the fluid formulations according to the invention do not contain any organic solvents, they are as a rule suitable only for the preparation of aqueous padding liquors, dye baths and print pastes, but they can, under certain circumstances, also be employed for the preparation of organic dye baths or print pastes. Their composition can be indicated preferably as follows: 10 to 35, preferably 10 to 20, percent by weight of component (1), 1 to 40, preferably 20 to 40 or 10 to 30, percent by weight of component (2), 1 to 40, preferably 5 to 30 and in particular 5 to 20, percent by weight of component (3) and/or (4) and at least 5 percent by weight of water, the weight percentages relating to the total formulation and the sum of the constituents adding up to 100%.

These aqueous concentrated formulations are also very stable and can be diluted as desired with water for the preparation of, for example, dyeing liquors and padding liquors.

In the examples which follow, parts are parts by weight and percentages are percentages by weight. Below, reaction products which are suitable as the components (2), (3) and (4) are first listed.

Component (2):

| | |
|---|---|
| $B_1$ | Reaction product of ethylene glycol and 1,2-propylene oxide, molecular weight 2,000 |
| $B_2$ | Reaction product of propylene glycol and 1,2-propylene oxide, molecular weight 2,000 |
| $B_3$ | Reaction product of propylene glycol and 1,2-propylene oxide, molecular weight 2,700 |
| $B_4$ | Reaction product of glycerol and 1,2-propylene oxide, molecular weight 3,000 |
| $B_5$ | Reaction product of glycerol and 1,2-propylene oxide, molecular weight 3,100 |
| $B_6$ | Reaction product of glycerol and 1,2-propylene oxide, molecular weight 4,000 |
| $B_7$ | Reaction product of trimethylolpropane and 1,2-propylene oxide, molecular weight 2,500 |
| $B_8$ | Reaction product of trimethylolpropane and 1,2-propylene oxide, molecular weight 3,200 |
| $B_9$ | Reaction product of trimethylolpropane and 1,2-propylene oxide, molecular weight 4,000 |
| $B_{10}$ | Reaction product of trimethylolpropane and 1,2-propylene oxide, molecular weight 6,300 |
| $B_{11}$ | Reaction product of ethylenediamine and 1,2-propylene oxide, molecular weight 3,600 |
| $B_{12}$ | Reaction product of monoisopropanolamine and 1,2-propylene oxide, molecular weight 2,300 |
| $B_{13}$ | Reaction product of methanol (or 1-methoxy-2-propanol) and 1,2-propylene oxide, molecular weight 2,750 |
| $B_{14}$ | Reaction product of butanol and 1,2-propylene oxide, molecular weight 3,000 |
| $B_{15}$ | Reaction product of sorbitol and 1,2-propylene oxide, molecular weight 2,650 |
| $B_{16}$ | Reaction product of pentaerythritol and 1,2-propylene oxide, molecular weight 3,000 |
| $B_{17}$ | Reaction product of methylethanolamine and 1,2-propylene oxide, molecular weight 3,000 |
| $B_{18}$ | Reaction product of hexylamine and 1,2-propylene oxide, molecular weight 3,000 |
| $B_{19}$ | Reaction product of triethanolamine and 1,2-propylene oxide, molecular weight 3,650 |
| $B_{20}$ | Reaction product of triethylenetetramine and 1,2-propylene oxide, molecular weight 3,050 |
| $B_{21}$ | Reaction product of dipropylenetriamine and 1,2-propylene oxide, molecular weight 3,500 |
| $B_{22}$ | Adduct of 30 mols of propylene oxide and 1 mol of nonylphenol |
| $B_{23}$ | Reaction product of 3 mols of ethylene oxide and 1 mol of nonyl phenol |
| $B_{24}$ | Reaction product of 2 mols of ethylene oxide and 1 mol of nonylphenol |
| $B_{25}$ | Reaction product of 1 mol of ethylene oxide and 1 mol of 2-ethylhexanol |
| $B_{26}$ | Reaction product of 3 mols of ethylene oxide and 1 mol of stearyl alcohol |
| $B_{27}$ | Reaction product of 1 mol of ethylene oxide and 1 mol of butylphenol |
| $B_{28}$ | Reaction product of 10 mols of propylene oxide and 1 mol of dodecylphenol |
| $B_{29}$ | Reaction product of 5 mols of ethylene oxide and 1 mol of 2-ethylhexanol |
| $B_{30}$ | Reaction product of 8 mols of ethylene oxide and 1 mol of o-phenylphenol |
| $B_{31}$ | Reaction product of 3 mols of ethylene oxide and 1 mol of tridecyl alcohol |
| $B_{32}$ | Reaction product of 3 mols of ethylene oxide and 1 mol of hexadecyl alcohol |
| $B_{33}$ | Reaction product of 2 mols of ethylene oxide and 1 mol of lauryl alcohol |
| $B_{34}$ | Reaction product of 10 mols of ethylene oxide and 1 mol of 2-ethylhexanol |
| $B_{35}$ | Reaction product of 1,2-propylene oxide and 1 mol of oleyl alcohol (molecular weight 2,000) |
| $B_{36}$ | Reaction product of 60 mols of 1,2-propylene oxide and 1 mol of p-nonylphenol (molecular weight 3,700) |
| $B_{37}$ | Reaction product of 1 mol of polypropylene glycol (molecular weight 2,000) and 1 mol of oleic acid |
| $B_{38}$ | Reaction product of 2 mols of polypropylene glycol (molecular weight 1,000) and 1 mol of adipic acid |
| $B_{39}$ | Reaction product of 1,2-propylene oxide and 1 mol of lauryl sorbitane ester (molecular weight 2,500) |
| $B_{40}$ | Reaction product of propylene oxide and 1 mol of a polyaminoamide of the formula $C_{11}H_{23}CONHCH_2CH_2NHCH_2CH_2NHCH_2CH_2NH_2$ (molecular weight 2,600) |
| $B_{41}$ | Reaction product of 1 mol of tributylphenol and 5 mols of ethylene oxide |
| $B_{42}$ | Reaction product of 1 mol of nonylphenol and 6 mols of ethylene oxide |
| $B_{43}$ | Reaction product of 1 mol of octylphenol and 4 mols of ethylene oxide. |

Component (3):

| | |
|---|---|
| $C_1$ | Reaction product of coconut fatty and 2 mols of diethanolamine |
| $C_2$ | Reaction product of stearic acid and 2 mols of diethanolamine |
| $C_3$ | Reaction product of oleic acid and 2 mols of diethanolamine |
| $C_4$ | Reaction product of methyl laurate and 1 to 2 mols of diethanolamine. |

Anionic compounds (component 4):

| | |
|---|---|
| $D_1$ | Ammonium salt of the acid sulfate of the adduct of 2 mols of ethylene oxide and 1 mol of p-tert.-nonylphenol; |
| $D_2$ | Ammonium salt of the acid sulfate of the adduct of 3 mols of ethylene oxide and 1 mol of tridecyl alcohol; |
| $D_3$ | Sodium salt of the acid maleate of the adduct of 2 mols of ethylene oxide and 1 mol of p-nonylphenol; |
| $D_4$ | Ammonium salt of the acid sulfate of the adduct of 3 mols of ethylene oxide and 1 mol of p-butylphenol; |
| $D_5$ | Ammonium salt of the acid phosphate of the adduct of 2 mols of ethylene oxide and 1 mol of p-nonylphenol; |
| $D_6$ | Sodium salt of the carboxymethyl ether of the adduct of 4 mols of ethylene oxide and 1 mol of p-octylphenol; |
| $D_7$ | Sodium salt of the di-sulfosuccinate of the adduct of 4 mols of ethylene oxide and 1 mol of p-octylphenol; |
| $D_8$ | Ammonium salt of the acid sulfate of coconut fatty acid diglycol; |

| | -continued |
|---|---|
| D$_9$ | Ammonium salt of the acid sulfate of the adduct of 1 mol of ethylene oxide and 1 mol of stearyl alcohol; |
| D$_{10}$ | Ammonium salt of the acid sulfate of the adduct of 9 mols of ethylene oxide and 1 mol of p-nonylphenol; |
| D$_{11}$ | Ammonium salt of the acid sulfate of the adduct of 6 mols of ethylene oxide and 1 mol of p-nonylphenol; |
| D$_{12}$ | Sodium salt of the monosulfosuccinate of the adduct of 2 mols of ethylene oxide and 1 mol of p-nonylphenol; |
| D$_{13}$ | Ammonium salt of the acid sulfate of the adduct of 1 mol of propylene oxide and 1 mol of ethylene oxide and 1 mol of nonylphenol; |
| D$_{14}$ | Ammonium salt of the acid sulfate of the adduct of 10 mols of propylene oxide and 10 mols of ethylene oxide and 1 mol of nonylphenol; |
| D$_{15}$ | Ammonium salt of the acid sulfate of the adduct of 6 mols of ethylene oxide and 1 mol of dodecylphenol; |
| D$_{16}$ | Ammonium salt of the acid sulfate of the adduct of 6 mols of ethylene oxide and 1 mol of pentadecylphenol; |
| D$_{17}$ | Ammonium salt of the acid sulfate of the adduct of 5 mols of ethylene oxide and 1 mol of tributylphenol; |
| D$_{18}$ | Ammonium salt of the acid sulfate of the adduct of 3 mols of ethylene oxide and 1 mol of Alfol (2022); |
| D$_{19}$ | Ammonium salt of the acid sulfate of the adduct of 2 mols of ethylene oxide and 1 mol of hydroabietyl alcohol; |
| D$_{20}$ | Ammonium salt of the acid sulfate of the adduct of 2 mols of ethylene oxide and 1 mol of octylphenol; |
| D$_{21}$ | Ammonium salt of the acid sulfate of the adduct of 50 mols of ethylene oxide and 1 mol of nonylphenol; |
| D$_{22}$ | Ammonium salt of the acid sulfate of the adduct of 35 mols of ethylene oxide and 1 mol of nonylphenol; |
| D$_{23}$ | Ammonium salt of the acid sulfate of the adduct of 15 mols of propylene oxide and 1 mol of nonylphenol; |
| D$_{24}$ | Ammonium salt of the acid sulfate of the adduct of 8 mols of ethylene oxide and 1 mol of o-phenylphenol; |
| D$_{25}$ | Ammonium salt of the acid sulfate of the adduct of 1 mol of ethylene oxide and 1 mol of 2-ethylhexanol; |
| D$_{26}$ | Ammonium salt of the acid sulfate of the adduct of 2 mols of ethylene oxide and 1 mol of coconut fatty acid; |
| D$_{27}$ | Ammonium salt of the acid sulfate of the adduct of 2 mols of propylene oxide and 1 mol of coconut fatty acid. |

EXAMPLE 1

(a) 108 parts of the dye of the formula

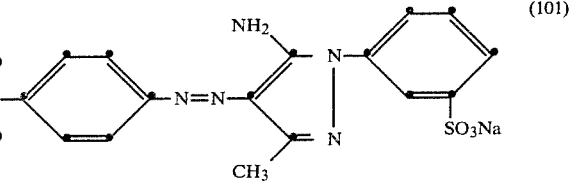

(101)

are introduced in the course of 5 minutes, with stirring and at 50° to 60° C., into the following assistant/solvent mixture: 49.2 parts of the reaction product B$_{30}$, 49.2 parts of the reaction product C$_1$ (containing about 2% of emulsified silicone oil as an anti-foam, and about 2.2% of acetic acid), 98.4 parts of ethylene glycol monoethyl ether, 147.6 parts of diethylene glycol and 147.6 parts of water.

The dye is introduced as a crude dye which contains sodium chloride. After stirring for two hours at 50° to 60° C., stirring is continued for 3 further hours at room temperature.

To remove undissolved fractions (impurities), the solution is passed through a steel sieve of about 40 μm mesh width (if desired, the solution can also be centrifuged).

This gives 585 parts (97.5% of theory) of a mobile, homogeneous, storage-stable dye solution which, even after 10 months' storage at room temperature, is still stable, i.e. it does not show any precipitation (crystallisation) of the dye. One of the reaction products B$_1$ to B$_{29}$ or B$_{31}$ to B$_{43}$ can also be used in place of the reaction product B$_{30}$.

(b) A dye solution having similarly good properties is obtained when the same quantity of butyrolacetone is used in place of ethylene glycol monoethyl ether.

(c) A dye solution having similarly good properties has, for example, the following composition: 15% of the dye of the formula (101), 4.25% of the reaction product B$_{30}$, 4.25% of the reaction product C$_1$, 25.5% of butyrolactone, 25.5% of diethylene glycol and 25.5% of water.

EXAMPLE 2

Following the procedure of Example 1, a stable fluid dye solution of the following composition is prepared: 18.0% of the dye of the formula (101), 8.2% of the reaction product B$_{30}$, 8.2% of the reaction product D$_1$ (50% aqueous preparation containing about 0.1% of emulsified silicone oil), 16.4% of butyrolactone, 24.6% of diethylene glycol and 24.6% of water.

Even after 10 months, the dye solution is still homogeneous and does not show any precipitates. One of the reaction products D$_2$ to D$_{27}$ can also be used in place of the reaction product D$_1$.

EXAMPLE 3

(a) 20 parts of the dye of the formula

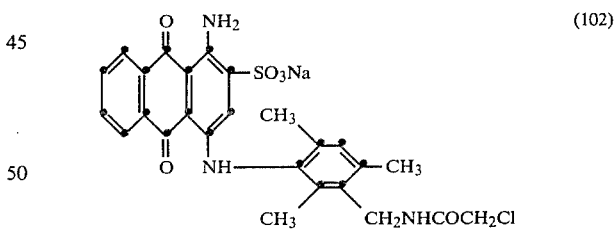

(102)

are introduced, in accordance with the procedure of Example 1, into the following assistant/solvent mixture, at 50° to 60° C. with stirring: 12 parts of the reaction product B$_{30}$, 12 parts of the reaction product C$_1$, 24 parts of diethylene glycol, 16 parts of ethylene glycol monoethyl ether and 16 parts of water.

This gives a mobile clear dye solution having an excellent storage stability.

(b) A dye solution having comparably good properties is obtained, when tetramethylurea is used in place of ethylene glycol monoethyl ether.

(c) A dye solution having likewise an excellent storage stability is obtained, when the following components are used: 20 parts of the dye of the formula (102), 12 parts of the reaction product $B_{30}$, 12 parts of the reaction product $D_1$, 32 parts of diethylene glycol and 24 parts of tetramethylurea.

EXAMPLE 4

22 parts of the dye of the formula

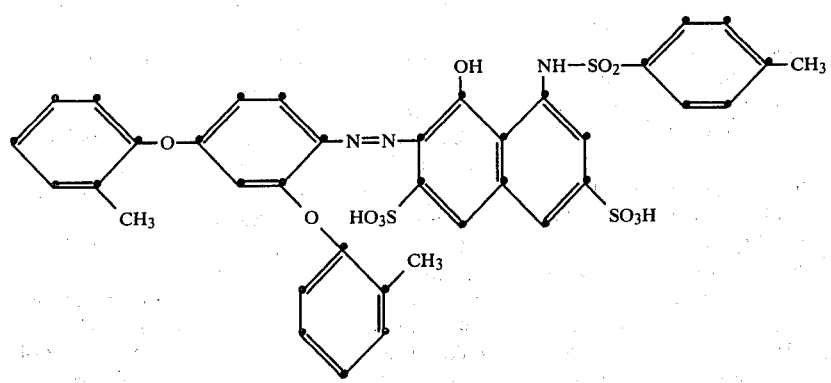

are introduced, at 50° to 60° C. with stirring, into an assistant/surfactant mixture which consists of 37.4 parts of ethylene glycol, 31.2 parts of ethylene glycol monoethyl ether, 4.7 parts of the reaction product $B_{30}$ and 4.7 parts of the reaction product $D_1$ (50% aqueous preparation containing about 0.1% of emulsified silicone oil).

After stirring for 2 hours at 50° to 60° C., stirring is continued at room temperature for a further 3 hours. To separate off insoluble substances (salts and organic impurities), the mixture is centrifuged or filtered (for example through a sieve of 5-15 μm mesh width). After centrifuging, 95 parts (95% yield) of a homogeneous dye solution are obtained. This solution has good storage stability. The spray solutions, prepared from this, for dyeing leather (which is dyed in clear, full, red shades) also have good stability. Such spray solutions are prepared, for example, as follows:

10 parts of dye solutions + 90 parts of deionised water
10 parts of dye solution + 10 parts of ethylene glycol monoethyl ether + 80 parts of water.

Replacing the 4.7 parts of the reaction product $D_1$ by 4.7 parts of the reaction product $C_1$ (containing about 2% of emulsified silicone oil), a dye solution having similarly good properties is obtained.

EXAMPLE 5

A dye solution having similar properties is obtained when, in place of the assistant/surfactant mixture used in Example 4, the following mixture is used: 29.6 parts of ethylene glycol, 31.2 parts of tetramethylurea, 4.7 parts of the reaction product $B_{30}$, 4.7 parts of the reaction product $D_1$ (50% aqueous preparation as in Example 4) and 7.8 parts of water.

EXAMPLE 6

According to Example 4, 22 parts of the dye of the formula (103) are dissolved in a mixture of 31.2 parts of diethylene glycol, 27.3 parts of diethylene glycol monoethyl ether, 3.9 parts of water, 7.8 parts of the reaction product $B_{30}$ and 7.8 parts of the reaction product $D_1$ (50% aqueous preparation as in Example 4) and, after centrifuging, 94.6 parts of a homogeneous dye solution are obtained (94% yield). This solution is storage-stable. The spray solutions prepared from this (according to Example 4) for leather dyeing have an excellent stability.

EXAMPLE 7

20 parts of the dye of the formula

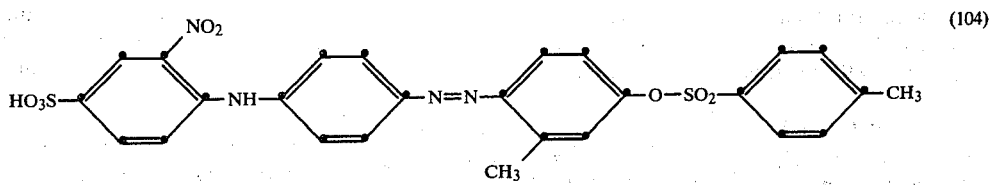

are introduced, at 50° to 60° C. with good stirring, into a mixture of 40 parts of diethylene glycol, 30 parts of ethylene glycol monoethyl ether, 5 parts of reaction product $B_{30}$ and 5 parts of reaction product $C_1$ (containing about 2% of emulsified silicone oil), and the mixture is stirred for 2 hours at this temperature and then for 3 hours at room temperature. The slightly turbid solution is centrifuged, 96.3 parts (96.3% yield) of a clear dye solution being isolated. This solution has good storage stability. The solutions prepared from this (according to Example 4) for spray-dyeing of leather are sufficiently stable. The leather is dyed in clear yellow shades.

EXAMPLE 8

Replacing the assistant/surfactant mixture used in Example 7 by the following mixture, a dye solution having similarly good properties is obtained: 32 parts of diethylene glycol, 24 parts of tetramethylurea, 8 parts of the reaction product B₃₀, 8 parts of the reaction product C₁ (containing about 2% of emulsified silicone oil) and 8 parts of water.

After centrifuging, 97.1 parts (97.1% yield) of a clear dye solution are obtained. A solution having likewise excellent properties is obtained when, in the assistant-/surfactant mixture used above, 8 parts of the reaction product D₁ (50% aqueous preparation as in Example 4) are employed in place of 8 parts of the reaction product C₁. This solution, and spray solutions prepared from it (according to Example 4), for leather dyeing are distinguished by particularly high stability.

EXAMPLE 9

Replacing the assistant/surfactant mixture of Example 8 by the following mixture, a clear yellow dye solution having good stability is obtained when the dye of the formula (104) is used: 32 parts of diethylene glycol, 28 parts of γ-butyrolactone, 8 parts of the reaction product B₃₀, 8 parts of the reaction product C₁ (containing about 2% of emulsified silicone oil) and 4 parts of water.

With the use of 20 parts of the dye of the formula (104), 96.9 parts (96.9% yield) of this clear yellow dye solution are obtained after centrifuging.

Replacing the 8 parts of the reaction product C₁ in this assistant/surfactant mixture by 8 parts of the reaction product D₁ (50% aqueous preparation as in Example 4), 96.6 parts (96.6% yield) of a clear, yellow dye solution are obtained after centrifuging. Spray solutions prepared from this solution (according to Example 4) for leather dyeing are likewise distinguished by good stability.

EXAMPLE 10

100 parts of the dyestuff solution according to Example (1c) are mixed with 100 parts of ethyleneglycolmonoethylether and 800 parts of water to form a spray solution.

This solution is applied in an amount of 20 to 100 g per square meter, by means of a spray gun or a spray machine (for example provided with a circular runner on which are mounted 4 to 8 guns), to leather (usually undyed leather, but pre-dyed leather may also be used). There is thus obtained a very level, greenish-yellow dyeing on the leather (in pale or deep shades depending on the amount applied), which has very good fastness properties, for examples fastness to migration, water drops, and to solvents (acetone and alcohol).

What is claimed is:

1. A method of preparation of a spray solution for dyeing leather, which comprises diluting a stable concentrated fluid formation with water, organic solvents, or a mixture of water and organic solvents, the fluid formulation containing, in the absence of metallized dyes:
    (1) a metal-free leather dye consisting essentially of a monoazo or polyazo dye or an anthraquinone dye,
    (2) a non-ionic compound having a hydrotropic action, at least one of the components (3) or (4), the component
    (3) being a reaction product of a fatty acid having 8 to 22 carbon atoms and 1 to 2 mols of diethanolamine, and the component
    (4) being a compound of the formula

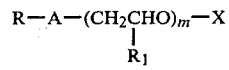

in which R is an aliphatic hydrocarbon radical having 8 to 22 carbon atoms or a cycloaliphatic, aromatic or aliphatic-aromatic hydrocarbon radical having 10 to 22 carbon atoms, R₁ is hydrogen or methyl, A is —O— or

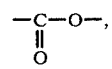

X is the acid radical of an inorganic oxygen containing acid, the acid radical of a polybasic carboxylic acid or a carboxyalkyl radical and m is a number from 1 to 50, and
    (5) water, a water-soluble organic solvent having a boiling point of at least 80° C., or a mixture of the two.

2. A method according to claim 1, which contains, as the formulation component (5), a water-soluble organic solvent having a boiling point of at least 80° C., or a mixture of water and this solvent.

3. A method according to claim 1, which contains, in the formulation, at least 10 percent by weight of the dye, relative to the weight of the formulation.

4. A method according to claim 3, wherein the formulation contains 10 to 60 percent by weight of component (1), 1 to 25 percent by weight of component (2), 1 to 20 percent by weight of at least one of components (3) and (4) and 20 to 88 percent by weight of component (5), the weight percentages relating to the total formulation an the sum of the constituents adding up to 100%.

5. A method according to claim 4, wherein the formulation contains 10 to 30 percent by weight of component (1) 1 to 20 percent by weight of component (2), 1 to 15 percent by weight of at least one of components (3) and (4) and 20 to 88 percent by weight of component (5), the weight percentages relating to the total formulation and the sum of the constituents adding up to 100%.

6. A method according to claim 5, wherein the formulation contains 10 to 30 percent by weight of component (1), 3 to 20 percent by weight of component (2), 3 to 20 percent by weight of at least one of components (3) and (4) and 30 to 84 percent by weight of component (5), the weight percentages relating to the total formulation and the sum of the constituents adding up to 100%.

7. A method according to claim 3, wherein the formulation contains 10 to 35 percent by weight of component (1), 1 to 40 percent by weight of component (2), 1 to 40 percent by weight of at least one of components (3) and (4) and at least 5 percent by weight of water, the weight percentages relating to the total formulation and the sum of the constituents adding up to 100%.

8. A method according to claim 1, wherein, in the formulation, the non-ionic compound, having a hydrotropic action, representing component (2) is a reaction product, having a molecular weight of about 2,000 to 7,000, of
    (a₁) a monohydric to hexahydric alcohol having 1 to 6 carbon atoms, monalkylamines or monoalkylolmonoamines or polyalkylenepolyamines and
    (a₂) 1,2-propylene oxide, a reaction product of an alkylene oxide and a water-insoluble aliphatic monoalcohol having at least 8 carbon atoms, a reaction product of an alkylene oxide and an arylphenol or alkylphenol, a reaction product of a saturated dicarboxylic acid having 3 to 10 carbon atoms and 1,2-propylene oxide or a polypropylene glycol, a reaction product of a fatty acid having 10 to 18 carbon atoms and 1,2-propylene oxide or a polypropylene glycol, a reaction product of a fatty acid having 10 to 18 carbon atoms, a trihydric to hexahydric alcohol and 1,2-propylene oxide or a reaction product of a fatty acid having 10 to 18 carbon atoms, a polyalkylenepolyamine and 1,2-propylene oxide.

9. A method according to claim 8, wherein, in the formulation, component (2) is a reaction product of ethylene glycol, propylene glycol, glycerol, trimethylolpropane, pentaerythritol, sorbitol or trimethylolethane and 1,2-propylene oxide.

10. A method according to claim 9, wherein, in the formulation, component (2) is a reaction product of a monoalkylamine or monoalkylolmonoamine having 1 to 6 carbon atoms or a polyalkylenepolyamine of the formula

H$_2$N(CH$_2$CH$_2$NH)$_r$CH$_2$CH$_2$NH$_2$ in which r is 0 or a number from 1 to 3, and 1,2-propylene oxide.

11. A method according to claim 10, wherein, in the formulation, component (2) is a reaction product of monoisopropanolamine or ethylene diamine and 1,2-propylene oxide.

12. A method according to claim 8, wherein, in the formulation, component (2) is an aliphatic, saturated or unsaturated, branched or straight-chain monoalcohol having 8 to 18 carbon atoms, or a mixture of such alcohols.

13. A method according to claim 8, wherein, in the formulation, component (2) is a reaction product of ethylene oxide, 1,2-propylene oxide or a mixed ethylene-1,2-propylene oxide and an aliphatic, saturated or unsaturated, branched or straight-chain monoalcohol having 8 to 18 carbon atoms.

14. A method according to claim 13, wherein, in the formulation, component (2) is a compound of the formula

R$_3$O(CH$_2$CH$_2$O)$_s$H in which R$_3$ is a saturated or unsaturated hydrocarbon radical having 8 to 18 carbon atoms and s is a number from 1 to 10.

15. A method according to claim 8, wherein, in the formulation, component (2) is a reaction product of ethylene oxide, 1,2-propylene oxide or a mixed ethylene-1,2-propylene oxide and an alkylphenol having 4 to 12 carbon atoms in the alkyl part.

16. A method according to claim 15, wherein, in the formulation, component (2) is a compound of the formula

in which R$_1$ is hydrogen or methyl, p is a number from 4 to 12 and t is a number from 1 to 60, in particular from 1 to 30.

17. A method according to claim 8, wherein, in the formulation, component (2) is a reaction product of o-phenylphenol and 5 to 15 mols of ethylene oxide.

18. A method according to claim 8, wherein, in the formulation, component (2) is a reaction product of a saturated dicarboxylic acid having 3 to 10 carbon atoms and 1,2-propylene oxide or a polypropylene glycol.

19. A method according to claim 18, wherein, in the formulation, component (2) is a reaction product of adipic acid or sebacic acid and 1,2-propylene oxide or a polypropylene glycol.

20. A method according to claim 8, wherein, in the formulation, component (2) is a reaction product of a fatty acid having 10 to 18 carbon atoms and 1,2-propylene oxide.

21. A method according to claim 8, wherein, in the formulation, component (2) is a reaction product of a fatty acid having 10 to 18 carbon atoms, a trihydric to hexahydric alcohol having 3 to 6 carbon atoms and 1,2-propylene oxide.

22. A method according to claim 8, wherein, in the formulation, component (2) is a reaction product of a fatty acid having 10 to 18 carbon atoms, a polyalkylenepolyamine of the formula

H$_2$N(CH$_2$CH$_2$NH)$_n$CH$_2$CH$_2$NH$_2$ in which n is zero or the number 1, 2 or 3, and 1,2-propylene oxide.

23. A method according to claim 1, wherein, in the formulation, component (3) is a reaction product of coconut fatty acid, lauric acid, oleic acid or stearic acid and 2 mols of diethanolamine.

24. A method according to claim 1, wherein component (4) is a compound of the formula

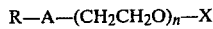
R—A—(CH$_2$CH$_2$O)$_n$—X in which R, A and X are as defined in claim 1 and n is a number from 1 to 9, preferably from 1 to 4.

25. A method according to claim 24, wherein, in the formulation, component (4) is a compound of the formula

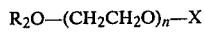
R$_2$O—(CH$_2$CH$_2$O)$_n$—X in which R$_2$ is a saturated or unsaturated hydrocarbon radical, o-phenylphenyl or alkylphenyl having 4 to 12 carbon atoms in the alkyl part, and X and n are as defined in claim 24.

26. A method according to claim 25, wherein, in the formulation, component (4) is a compound of the formula

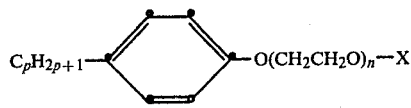

in which p is a number from 4 to 12 and n and X are as defined in claim 25.

27. A method according to claim 26, wherein, in the formulation, component (4) is a compound of the formula

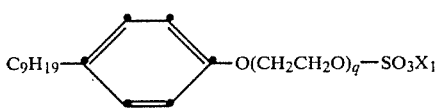

in which q is a number from 1 to 3 and $X_1$ is hydrogen, $NH_4$ or an alkali metal cation.

28. A method according to claim 1, wherein component (4) is a compound of the formula

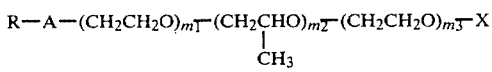

in which R, A and X are as defined in claim 1, the sum of $m_1$, $m_2$ and $m_3$ is 2 to 20 and the ratio of ethylene oxide units to propylene oxide units is 1:(1 to 2).

29. A method according to claim 1, wherein, in the formulation, the compounds representing component (4) are present as an alkali metal salt, ammonium salt or an amine salt.

30. A method according to claim 1, wherein, in the formulation, component (5) is water, a polyhydric alcohol, which is liquid at room temperature, or an ether, ester or mixed ether-ester thereof, tetramethylurea or a mixture of water and these solvents.

31. A method of the preparation of a stable concentrated fluid formulation of a metal-free dye, according to claim 1, which comprises mixing the dye with the components (2) and (3), (2) and (4) or (2), (3) and (4) in any desired sequence in water, a water-soluble organic solvent or mixtures thereof, optionally in the presence of conventional formulating assistants.

32. A method of the preparation of a stable concentrated fluid formulation of a metal-free water-soluble dye, according to claim 1, which comprises separating by-products of the synthesis, water-soluble salts and, optionally a proportion of the water from an aqueous solution or suspension of at least one metal-free water-soluble crude dye, optionally drying the resulting dye formulation, and then mixing it with the components (2) and (3), (2) and (4) or (2), (3) and (4) in any desired sequence in water, a water-soluble organic solvent or mixtures thereof, optionally in the presence of conventional formulating assistants.

* * * * *